United States Patent
Abdi Taghi Abad et al.

(10) Patent No.: US 12,112,370 B2
(45) Date of Patent: Oct. 8, 2024

(54) SECURE MULTI-PARTY COMPUTATION FOR SENSITIVE CREDIT SCORE COMPUTATION

(71) Applicant: Capital One Services, LLC, McLean, VA (US)

(72) Inventors: Fardin Abdi Taghi Abad, Champaign, IL (US); Austin Walters, Savoy, IL (US); Jeremy Goodsitt, Champaign, IL (US); Anh Truong, Champaign, IL (US); Mark Watson, Urbana, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 156 days.

(21) Appl. No.: 17/929,229

(22) Filed: Sep. 1, 2022

(65) Prior Publication Data

US 2022/0414768 A1 Dec. 29, 2022

Related U.S. Application Data

(63) Continuation of application No. 16/893,557, filed on Jun. 5, 2020, now Pat. No. 11,436,671.

(51) Int. Cl.
*G06Q 40/03* (2023.01)
*H04L 9/08* (2006.01)

(52) U.S. Cl.
CPC ........... *G06Q 40/03* (2023.01); *H04L 9/0861* (2013.01); *G06Q 2220/00* (2013.01); *H04L 2209/46* (2013.01)

(58) Field of Classification Search
None
See application file for complete search history.

(56) References Cited

U.S. PATENT DOCUMENTS

2017/0344952 A1* 11/2017 Kenthapadi ........... G06F 21/602
2019/0073608 A1* 3/2019 Veeningen ............. G06N 20/00
(Continued)

FOREIGN PATENT DOCUMENTS

WO 2006103608 10/2006
WO WO-2016075512 A1 * 5/2016 ............. G06F 21/72
(Continued)

OTHER PUBLICATIONS

Archer, et al., From Keys to Databases—Real-World Applications of Secure Multi-Party Computation, Cryptology ePrint Archive, Paper 2018/450, retrieved from https://eprint.iacr.org/2018/450 (Year: 2018).*

(Continued)

*Primary Examiner* — Gregory S Cunningham, II
(74) *Attorney, Agent, or Firm* — DLA PIPER LLP (US)

(57) ABSTRACT

A computing system retrieves a credit check algorithm. The credit check algorithm utilizes one or more parameters for evaluation of a credit score of an individual. The computing system identifies a plurality of entities contributing parameters for the evaluation of the credit score of the individual. The computing system compiles the credit check algorithm into a plurality of components. Each component corresponds to a respective entity of the plurality of entities and each component generates an output unique to the respective entity. The computing system transmits each component to a respective entity of the plurality of entities. The computing system instructs each entity to share a respective output with each remaining entity. The computing system receives a credit score for the individual from each of the plurality of entities. Each credit score received from each entity is the same.

20 Claims, 5 Drawing Sheets

(56) References Cited

U.S. PATENT DOCUMENTS

2019/0228469 A1 7/2019 Yu et al.
2020/0202018 A1* 6/2020 Ciocarlie ................ H04L 9/085
2020/0226284 A1* 7/2020 Yin ..................... G06F 21/6254

FOREIGN PATENT DOCUMENTS

WO 2021062234 4/2021
WO WO-2021062234 A1 * 4/2021 ........... G06F 21/602

OTHER PUBLICATIONS

Volgushev, N., Schwarzkopf, M., Getchell, B., Varia, M., Lapets, A., and Bestavros, A., "Conclave: secure multi-party computation on big data (extended TR)" (2019), retrieved from https://arxiv.org/pdf/1902.06288.pdf (Year: 2019).*
Wichs, "Lecture 3: Multiparty Computation", CS 7880 Graduate Cryptography, Sep. 13, 2017, 6 pages.
Wikipedia, "Secure Multi-Party Computation", https://en.wikipedia.org/wiki/Secure_multi-party_computation, 11 pages.
Hastings, et al. "SoK: General purpose compilers for secure multi-party computation", IEEE Symposium on Security and Privacy, May 2, 2019, https://www.youtube.com/watch?v=FpFQdGpstdQ.
Hastings, "SoK: General Purpose Frameworks for Secure Multi-Party Computation", IEEE Symposium on Security and Privacy, Jun. 3, 2019, https://www.youtube.com/watch?v=I0bremwQ_ns.
Volgushev, et al., "Conclave: secure multi-party computation on big data," Proceedings of the Fourteenth EuroSys Conference, 2019, 18 pages.
Kushilevitz, "Communication Complexity," https://www.sciencedirect.com/topics/computer-science/boolean-circuit, 1997.
Kusgukevitz E., "Boolean Circuit," Advances in Computers, 1997, Entire Document Pertinent, Retrieved from URL: https://www.sciencedirect.com/topics/computer-science/boolean-circuit.

* cited by examiner

SECURE MULTI-PARTY COMPUTATION FOR SENSITIVE CREDIT SCORE COMPUTATION

CROSS-REFERENCE TO RELATED APPLICATION INFORMATION

This is a continuation of U.S. patent application Ser. No. 16/893,557, filed Jun. 5, 2020, which is incorporated herein by reference in its entirety.

FIELD OF THE DISCLOSURE

The present disclosure generally relates to a system and method for secure multi-party computation for sensitive credit score computation.

BACKGROUND

The act of generating a credit score for an individual has become commonplace as various individuals desiring to see their credit score can access a variety of tools that provide users with their credit score almost immediately. The process of generating a credit score typically involves identifying all of the accounts associated with the individual for which the credit score is to be generated. Accordingly, the process involves the transmission of sensitive financial information and sensitive personal information.

SUMMARY

In some embodiments, a method is disclosed herein. A computing system retrieves a credit check algorithm. The credit check algorithm utilizes one or more parameters for evaluation of a credit score of an individual. The computing system identifies a plurality of entities contributing parameters for the evaluation of the credit score of the individual. The computing system compiles the credit check algorithm into a plurality of components. Each component corresponds to a respective entity of the plurality of entities and each component generates an output unique to the respective entity. The computing system transmits each component to a respective entity of the plurality of entities. The computing system instructs each entity to share a respective output with each remaining entity. The computing system receives a credit score for the individual from each of the plurality of entities. Each credit score received from each entity is the same.

In some embodiments, the credit check algorithm includes one or more of a number of lines of credit, a duration of each line of credit, a number of credit inquiries, a number of late payments, a debt to income ratio, and a payment history.

In some embodiments, compiling the credit check algorithm into a plurality of components includes the computing system generating a plurality of and-gates and or-gates for each entity to compute.

In some embodiments, instructing each entity to share the respective output with each remaining entity includes the computing system prompting each entity to share encrypted outputs with each remaining entity.

In some embodiments, a combination of each output generates the credit score of the individual.

In some embodiments, a computing system further transmits the credit score to a requesting entity.

In some embodiments, each component of the plurality of components is insufficient alone to generate the credit score of the individual.

In some embodiments, a system is disclosed herein. The system includes a processor and a memory. The memory has programming instructions stored thereon, which, when executed by the processor, performs one or more operations. The one or more operations include receiving a request to generate a credit score for an individual. The one or more operations further include retrieving a credit check algorithm. The credit check algorithm utilizes one or more parameters for evaluation the credit score. The one or more operations further include identifying a plurality of entities contributing parameters for the evaluation of the credit score of the individual. The one or more operations further include compiling the credit check algorithm into a plurality of components. Each component corresponds to a respective entity of the plurality of entities and each component generates an output unique to the respective entity. The one or more operations further include instructing each entity to share a respective output with each remaining entity. The one or more operations further include receiving credit score for the individual from each of the plurality of entities. Each credit score received from each entity is the same.

In some embodiments, the credit check algorithm includes one or more of a number of lines of credit, a duration of each line of credit, a number of credit inquiries, a number of late payments, a debt to income ratio, and payment history.

In some embodiments, compiling the credit check algorithm into a plurality of components includes generating a plurality of and-gates and or-gates for each entity to compute.

In some embodiments, instructing each entity to share the respective output with each remaining entity includes prompting each entity to share encrypted outputs with each remaining entity.

In some embodiments, a combination of each output generates the credit score of the individual.

In some embodiments, the one or more operations further includes transmitting the credit score to a requesting entity.

In some embodiments, each component of the plurality of components is insufficient alone to generate the credit score of the individual.

In some embodiments, a non-transitory computer readable medium is disclosed herein. The non-transitory computer readable medium includes one or more sequences of instructions that, when executed by one or more processors, causes the processors to perform operations. The operations include retrieving, by a computing system, a credit check algorithm. The credit check algorithm utilizes one or more parameters for evaluation a credit score of an individual. The operations further include identifying, by the computing system, a plurality of entities contributing to parameters for the evaluation of the credit score of the individual. The operations further include compiling, by the computing system, the credit check algorithm into a plurality of components. Each component corresponds to a respective entity of the plurality of entities and each component generates an output unique to the respective entity. The operations further include transmitting, by the computing system, each component to a respective entity of the plurality of entities. The operations further include instructing, by the computing system, each entity to share a respective output with each remaining entity. The operations further include receiving, by the computing system, a credit score for the individual from each of the plurality of entities. Each credit score received from each entity is the same.

In some embodiments, the credit check algorithm includes one or more of a number of lines of credit, a duration of each line of credit, a number of credit inquiries, a number of late payments, a debt to income ratio, and a payment history.

In some embodiments, compiling the credit check algorithm into a plurality of components includes generating a plurality of and-gates and or-gates for each entity to compute.

In some embodiments, instructing each entity to share the respective output with each remaining entity includes prompting each entity to share encrypted outputs with each remaining entity.

In some embodiments, a combination of each output generates the credit score of the individual.

In some embodiments, each component of the plurality of components is insufficient alone to generate the credit score of the individual.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method for secure multi-party computation for sensitive credit score computation. For example, the one or more techniques described herein are directed to compiling a credit score algorithm into a plurality of components. Each component of the plurality of components may correspond to a respective entity that is involved in the credit score generation process. By compiling the credit score algorithm into a plurality of components, each entity involved in the process of generating the credit score no longer has to expose the sensitive financial information of the individual. Instead, each entity may compute a single portion of the overall credit score. When all portions are combined, the overall credit score of the individual is generated. Thus, rather than share sensitive information among a plurality of entities, each entity may only need to share its respective output. In this manner, the user's financial information and personal information is protected.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
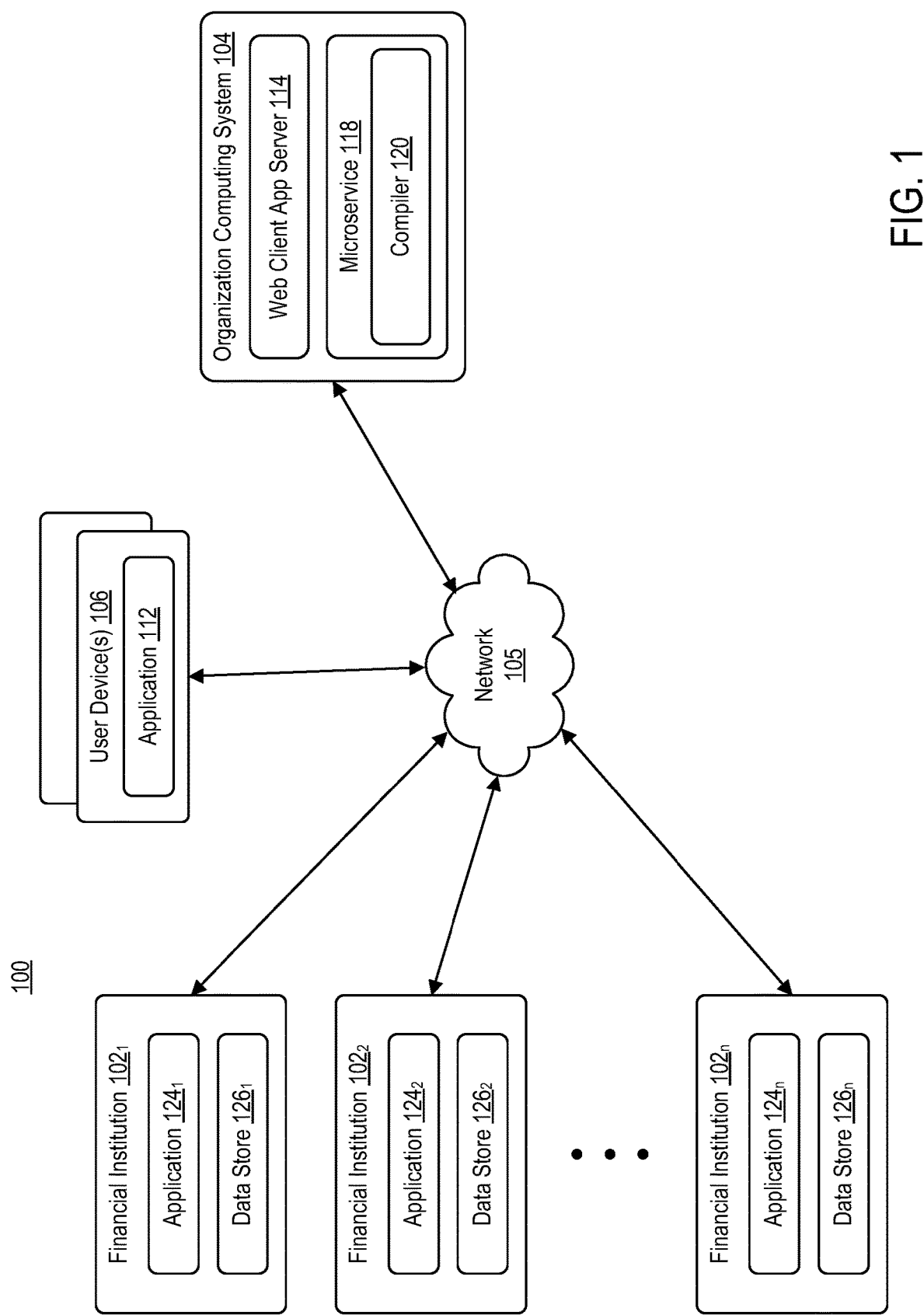
FIG. 1 is a block diagram illustrating a computing environment, according to example embodiments.

FIG. 1 is a block diagram illustrating a computing environment 100, according to one embodiment. Computing environment 100 may include one or more financial institutions $102_1$, $102_2$, and $102_n$ (hereinafter "financial institution 102"), an organization computing system 104, and one or more user devices 106 (hereinafter "user device 106") communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Each financial institution 102 may correspond to one or more computing devices associated with a financial institution. Examples of financial institutions may include, but are not limited to, banks (e.g., Capital One®), credit score agencies (e.g., Experian®, TransUnion, Equifax®), government agencies, and the like. Financial institution 102 may be representative of a mobile device, a tablet, a desktop computer, or any computing system having the capabilities described herein that is associated with a given financial institution.

Each financial institution 102 may include at least a respective application 124 and data store 126. Application 124 may be representative of a web browser that allows access to a website or a stand-alone application. Financial institution 102 may access application 124 to access functionality of organization computing system 104. For example, financial institution 102 may communicate over network 105 to request a webpage, for example, from web client application server 114. For example, financial institution 102 may be configured to execute application 124 to generate a credit score for an individual. The content that is displayed to financial institution 102 may be transmitted from organization computing system 104 to financial institution 102, and subsequently processed by application 124 for display through a graphical user interface associated with financial institution 102.

Data store 126 may store various sensitive financial information and personal identification information associated with various users. Exemplary sensitive financial information may include, but is not limited to, account information, loan information, payment history, etc. Exemplary personal identification information may include, but is not limited to, name, address, social security number, e-mail address, phone number, salary information, job information, and the like.

Organization computing system 104 may include at least web client application server 114 and microservice 118. Microservice 118 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Microservice 118 may be configured to facilitate a secure multi-party computation of a credit score. For example, microservice 118 may be configured to break down a credit score algorithm into a plurality of components. Generally, the credit score algorithm may utilize one or more parameters for evaluation of a credit score of an individual. One or more parameters may include, but are not limited to, payment history on an individual's accounts, amounts owed on the individual's accounts, length of the individual's credit history, types of credit implemented by the individual, any derogatory marks on an individual's credit history, pursuit of new credit (e.g., number of credit inquiries within the last X months), and the like.

As those understand, in order to adequately generate an individual's credit score, a respective entity (e.g., TransUnion®, Equifax®, Experian®, etc.) must have access to the user's sensitive financial information. As those skilled in the art recognize, providing a single entity with the user's sensitive financial information places the user at risk. To combat this, microservice 118 is configured to break down the credit score algorithm into a plurality of components and transmit those components to the individual financial institutions with which an individual has accounts. Microservice 118 may instruct each entity to share an output of their calculation with each other entity. Once each entity has all of the other entities' outputs, any entity may compute the credit score of the individual without needing sensitive financial information and personal information of the individual.

Microservice 118 may include at least compiler 120. Compiler 120 may be configured to break down a credit score algorithm into a plurality of components. In some embodiments, breaking down the credit score algorithm into the plurality of components may include compiler 120 generating a plurality of and-gates and/or or-gates for each entity to compute.

For example, organization computing system 104 may provide a credit score algorithm to microservice 118. This credit score algorithm may be provided to microservice 118 in a high-level language. Compiler 120 may convert the credit score algorithm into one or more Boolean circuit representation. In some embodiments, compiler 120 may further garble each Boolean circuit and execute a protocol across each user device 106 for securely evaluating the garbled circuit.

Each user device 106 may correspond to one or more computing devices associated with a requesting entity. A requesting entity may be referred to an individual or association that requests a credit score of an individual or on behalf of an individual. User device 106 may be representative of a mobile device, a tablet, a desktop computer, or any computing system having the capabilities described herein.

Each user device 106 may include at least application 112. Application 112 may be representative of a web browser that allows access to a website or a stand-alone application. In some embodiments, user device 106 may access application 112 to access functionality of organization computing system 104. In some embodiments, user device 106 may access application 112 to access functionality of a financial institution 102. For example, user device 106 may communicate over network 105 to request a webpage, for example, from web client application server 114 or a server associated with financial institution 102. For example, user device 106 may be configured to execute application 112 to request a credit score for an individual or on behalf of an individual. The content that is displayed to user device 106 may be transmitted from organization computing system 104 to user device 106, and subsequently processed by application 112 for display through a graphical user interface associated with user device 106.

Figure 2:
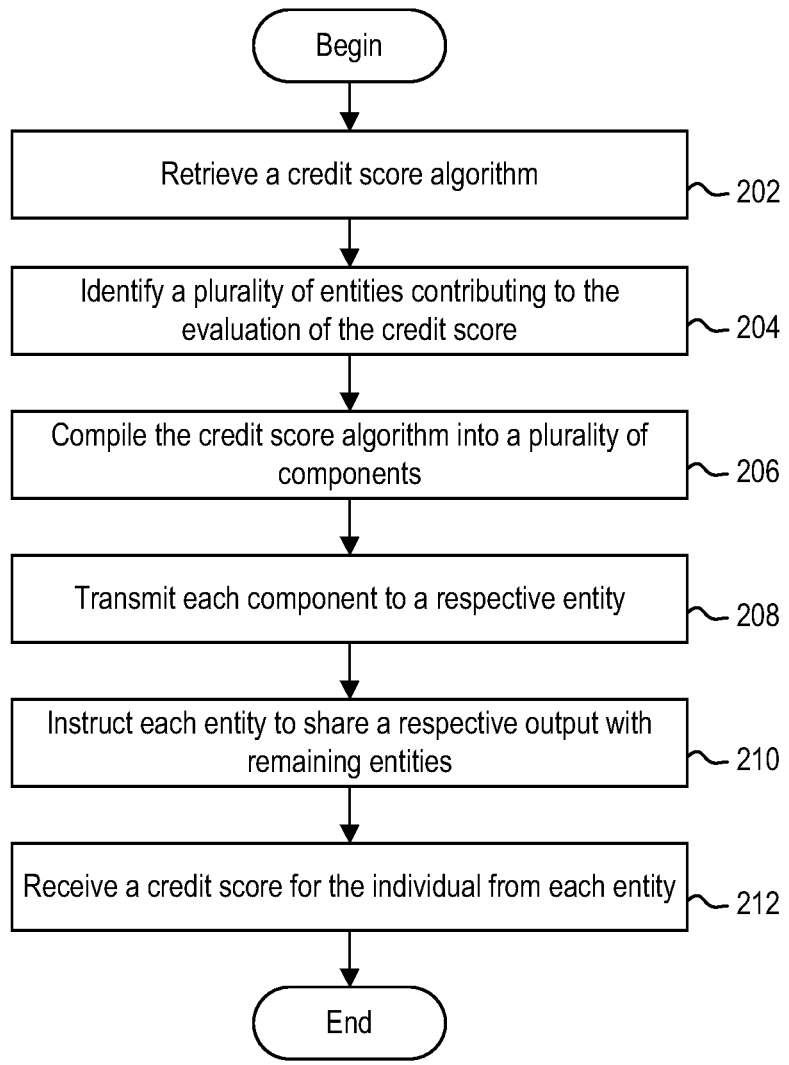
FIG. 2 is a flow diagram illustrating a method of performing secure multi-party computation of a credit score, according to example embodiments.

FIG. 2 is a flow diagram illustrating a method 200 of facilitating a secure multi-party computation for sensitive credit score computation, according to example embodiments. Method 200 may begin at step 202.

At step 202, organization computing system 104 may retrieve a credit score algorithm. The credit score algorithm may be used by various entities to assess the creditworthiness of an individual. In some embodiments, the credit score algorithm may take into account a variety of factors, such as, but not limited to, payment history on an individual's accounts, amounts owed on the individual's accounts, length of the individual's credit history, types of credit implemented by the individual, any derogatory marks on an individual's credit history, pursuit of new credit (e.g., number of credit inquiries within the last X months), and the like.

At step 204, organization computing system 104 may identify a plurality of entities contributing to the evaluation of the credit score. For example, upon receiving a request to generate a credit score, microservice 118 may utilize personal identification information of the target individual (e.g., social security number) to identify the entities with which the individual has accounts. In some embodiments, the entities may be representative of financial institutions (e.g., banks, lenders, etc.), utility companies (e.g., water, electric, gas, cable), and the like (e.g., subscription services, cable, internet, etc.).

At step 206, organization computing system 104 may compile the credit score algorithm into a plurality of components. For example, compiler 120 may break down the credit score algorithm into a plurality of components. In some embodiments, breaking down the credit score algorithm into the plurality of components may include compiler 120 generating a plurality of and-gates and/or or-gates for each entity to compute.

For example, organization computing system 104 may provide a credit score algorithm to microservice 118. This credit score algorithm may be provided to microservice 118 in a high-level language. Compiler 120 may convert the credit score algorithm into one or more Boolean circuit representation. In some embodiments, compiler 120 may further garble each Boolean circuit and execute a protocol across each user device 106 for securely evaluating the garbled circuit.

Generally, each component of the plurality of components allows each entity to calculate their own portion of the credit score algorithm, without revealing the individual's sensitive financial information or sensitive personal information to any of the other entities. However, each component alone may be insufficient to generate the overall credit score of the individual, in the case where multiple entities exist.

At step 208, organization computing system 104 may transmit each component to each respective entity. For example, microservice 118 may transmit each component of the plurality of components to each entity such that each respective entity may calculate their own respective portion of the overall credit score algorithm. In this manner, each entity may use their local sensitive financial information or their local personal identification information associated with the individual, without having to transmit such sensitive financial information or sensitive local personal identification information to other entities.

At step 210, organization computing system 104 may instruct each entity to share their respective output with each remaining entity. For example, microservice 118 may instruct each entity to generate their respective output using their dedicated component of the plurality of components. Microservice 118 may instruct each entity to transmit the output to each remaining entity, so that each entity may calculate the overall credit score of the individual. In some embodiments, microservice 118 may facilitate encrypting the output prior to transmitting the output to the remaining entities. Such encryption may act as an additional security layer.

At step 212, organization computing system 104 may receive a calculated credit score for the individual from each entity of the plurality of entities. For example, in some embodiments, to verify that each entity of the plurality of entities correctly calculated the individual's credit score, microservice 118 may request the final credit score from each of the entities. Ideally, each credit score of the plurality of credit scores will be the same. If, however, at least one of the credit scores differ from the others, the corresponding entity may need to restart the process.

Figure 3:
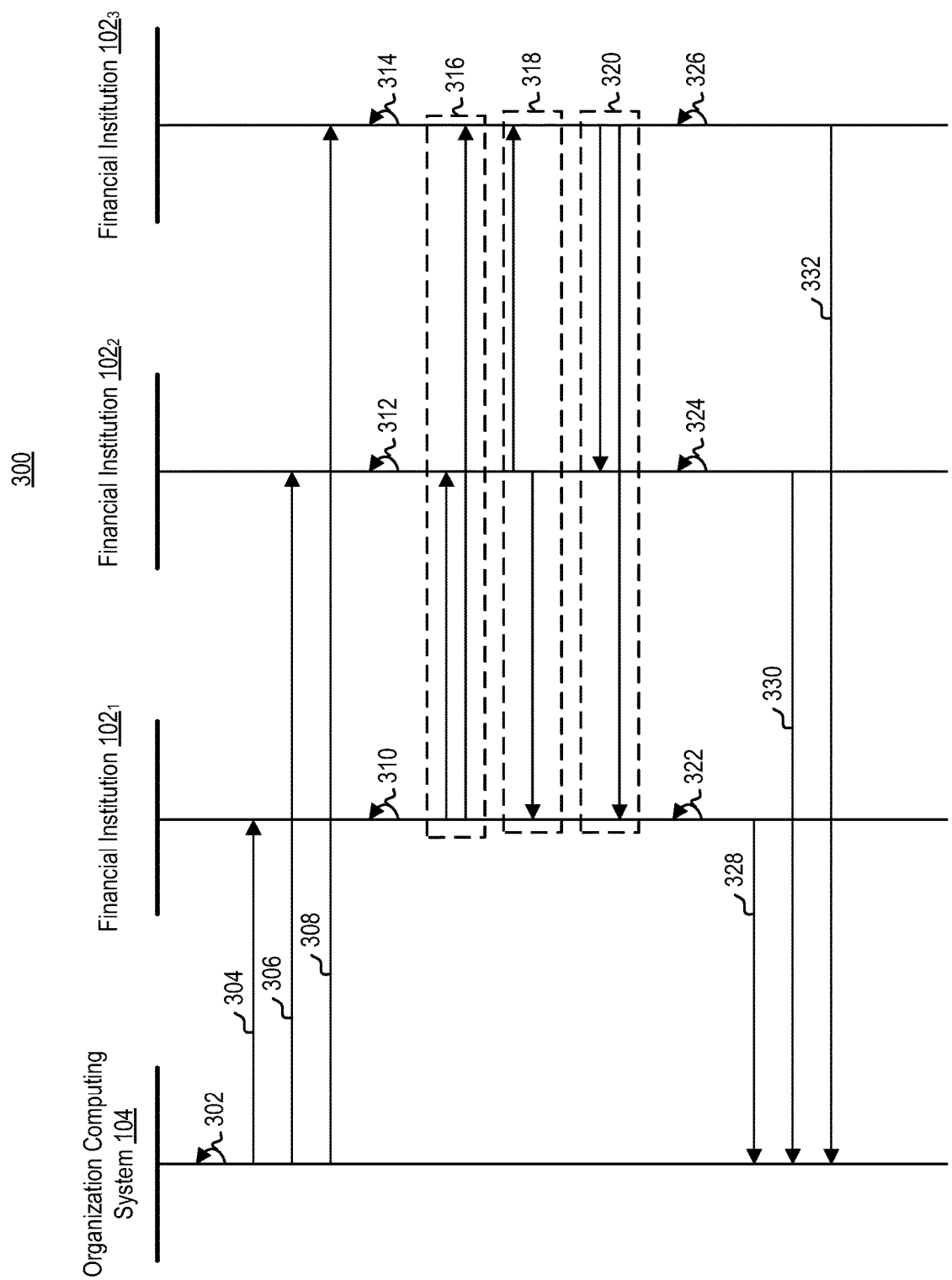
FIG. 3 is a block diagram illustrating communications among entities while performing secure multi-party computation of a credit score, according to example embodiments.

FIG. 3 is a block diagram 300 illustrating communications among entities while performing secure multi-party computation of a credit score, according to example embodiments.

At step 302, organization computing system 104 may retrieve a credit score algorithm. Microservice 118 can compile the credit score algorithm into a plurality of components. For example, compiler 120 may break down the credit score algorithm into a plurality of components. In some embodiments, breaking down the credit score algorithm into the plurality of components may include compiler 120 generating a plurality of and-gates and/or or-gates for each entity to compute.

At step 304, organization computing system 104 may transmit a first component of the plurality of components to financial institution $102_1$. At step 306, organization computing system 104 may transmit a second component of the plurality of components to financial institution $102_2$. At step 308, organization computing system 104 may transmit a third component of the plurality of components to financial institution $102_3$. In some embodiments, organization computing system 104 may further transmit instructions to each of financial institutions $102_1$-$102_3$ regarding the sharing of their respective outputs. In some embodiments, the instructions may include the encrypting of outputs prior to transmitting the outputs to the remaining entities.

At step 310, financial institution $102_1$ may use the first component to generate a first output for calculating the overall credit score of an individual. For example, financial institution $102_1$ may use sensitive financial information and/or sensitive personal identification information of the individual stored in data store $126_1$ to generate its respective output.

At step 312, financial institution $102_2$ may use the first component to generate a first output for calculating the overall credit score of an individual. For example, financial institution $102_2$ may use sensitive financial information and/or sensitive personal identification information of the individual stored in data store $126_2$ to generate its respective output.

At step 314, financial institution $102_3$ may use the first component to generate a first output for calculating the overall credit score of an individual. For example, financial institution $102_3$ may use sensitive financial information and/or sensitive personal identification information of the individual stored in data store $126_3$ to generate its respective output.

At step 316, financial institution $102_1$ may transmit its respective output to financial institution $102_2$ and financial institution $102_3$. In some embodiments, financial institution $102_1$ may encrypt the output prior to transmitting the output to financial institution $102_2$ and financial institution $102_3$.

At step 318, financial institution $102_2$ may transmit its respective output to financial institution $102_1$ and financial institution $102_3$. In some embodiments, financial institution $102_2$ may encrypt the output prior to transmitting the output to financial institution $102_1$ and financial institution $102_3$.

At step 320, financial institution $102_3$ may transmit its respective output to financial institution $102_1$ and financial institution $102_2$. In some embodiments, financial institution $102_3$ may encrypt the output prior to transmitting the output to financial institution $102_1$ and financial institution $102_2$.

At step 322, financial institution $102_1$ may generate the overall credit score of the individual based on the output generated by financial institution $102_1$ and the outputs received from financial institution $102_2$ and $102_3$, respectively. In some embodiments, generating the overall credit score may involve summing the three outputs.

At step 324, financial institution $102_2$ may generate the overall credit score of the individual based on the output generated by financial institution $102_2$ and the outputs received from financial institution $102_1$ and $102_3$, respectively. In some embodiments, generating the overall credit score may involve summing the three outputs.

At step 326, financial institution $102_3$ may generate the overall credit score of the individual based on the output generated by financial institution $102_3$ and the outputs received from financial institution $102_1$ and $102_2$, respectively. In some embodiments, generating the overall credit score may involve summing the three outputs.

At step 328, financial institution $102_1$ may transmit the generated overall credit score to organization computing system 104 for verification. At step 330, financial institution $102_2$ may transmit the generated overall credit score to organization computing system 104 for verification. At step 332, financial institution $102_3$ may transmit the generated overall credit score to organization computing system 104 for verification. Ideally, each credit score of the plurality of credit scores will be the same. If, however, at least one of the credit scores differ from the others, the corresponding financial institution 102 may need to restart the process.

Figure 4:
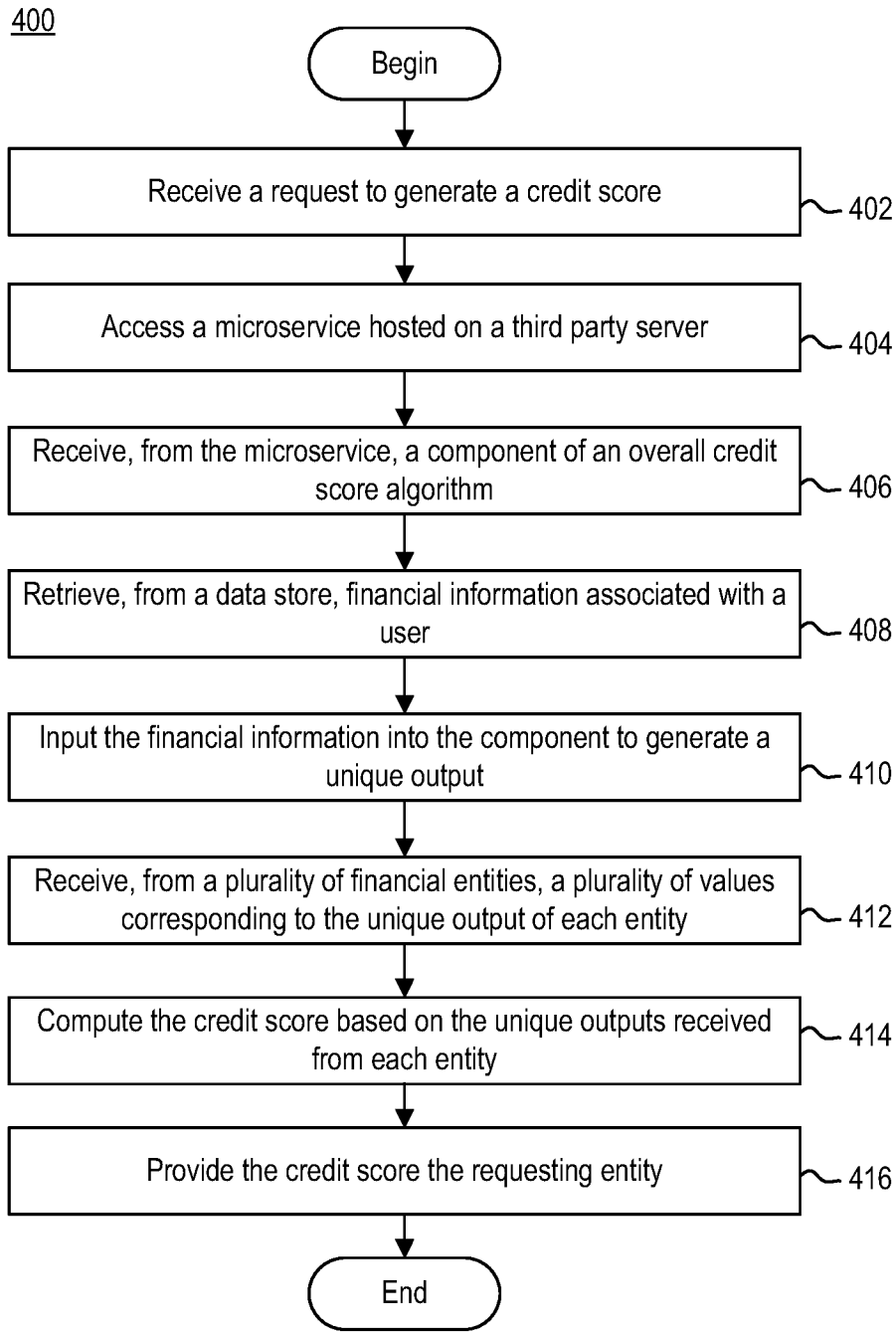
FIG. 4 is a flow diagram illustrating a method of performing secure multi-party computation of a credit score, according to example embodiments.

FIG. 4 is a flow diagram illustrating a method 400 of conducting a secure multi-party computation for sensitive credit score computation, according to example embodiments. Method 400 may begin at step 402.

At step 402, financial institution 102 may receive a request to generate a credit score of an individual. In some embodiments, financial institution 102 may receive a request from the individual directly via user device 106. In some embodiments, financial institution 102 may receive the request on behalf of the individual via user device 106. For example, financial institution 102 may receive the request from a lender. In some embodiments, the request may include identifying information about the individual. For example, the request may include at least the social security number of the individual.

At step 404, financial institution 102 may access microservice 118 hosted by organization computing system 104. In some embodiments, accessing microservice 118 may involve transmitting the identification information of the individual to microservice 118. For example, microservice 118 may utilize personal identification information of the target individual (e.g., social security number) to identify the entities with which the individual has accounts.

At step 406, financial institution 102 may receive, from microservice 118, a component of the overall credit score algorithm. Microservice 118 may compile the credit score algorithm into a plurality of components. Financial institution 102 may receive its dedicated component from microservice 118.

At step 408, financial institution 102 may retrieve, from its respective data store financial information and/or personal identification information associated with the individual. Exemplary financial information may include, but is not limited to, account information, loan information, payment history, etc. Exemplary personal identification information may include, but is not limited to, name, address, social security number, e-mail address, phone number, salary information, job information, and the like At step 410, financial institution 102 may selectively input the retrieved financial information and/or personal identification information to its respective component to generate a unique output. The unique output generated by financial institution 102 may only be a portion of the information needed to calculate the overall credit score of the individual.

At step 412, financial institution 102 may receive, from a plurality of other financial institutions, a plurality of values corresponding to the unique output of each entity. In some embodiments, each value of the plurality of values may be encrypted. Generally, each value of the plurality of values may not reveal any personal identification information or sensitive financial information of the individual.

At step 414, financial institution 102 may compute the credit score of the individual based on the unique output generated by financial institution 102 and the outputs received from the other financial institutions. In some embodiments, financial institution 102 may compute the credit score by summing the unique output and the outputs received from the other financial institutions. In this manner, financial institution 102 may generate a credit score of the individual without exposing the individual's personal identification information or sensitive financial information to other individuals.

At step 416, financial institution 102 may transmit the credit score the requesting entity (e.g., user device 106).

Figure 5:
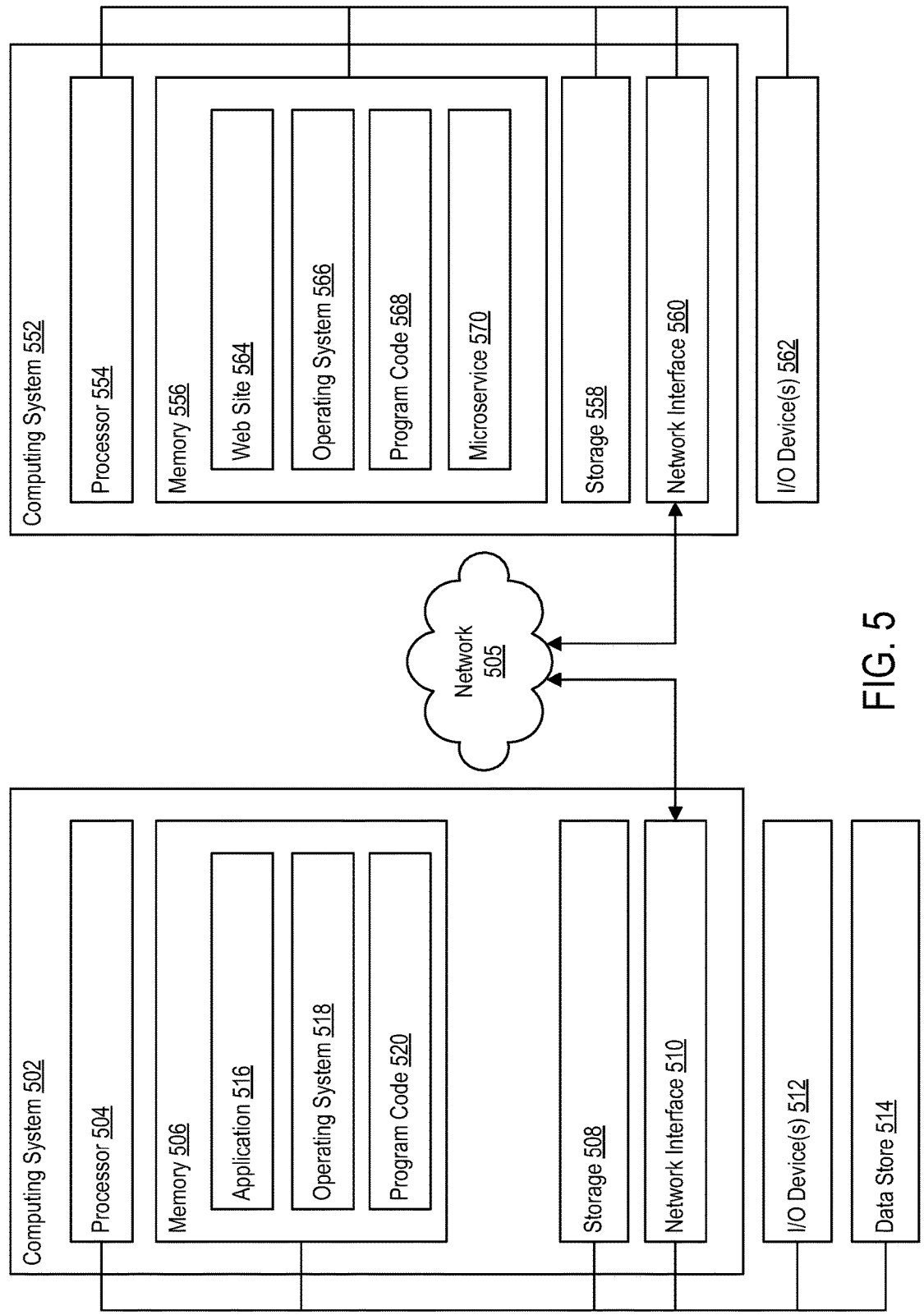
FIG. 5 is a block diagram illustrating a computing environment, according to example embodiments.

FIG. 5 is a block diagram illustrating an exemplary computing environment 500, according to some embodiments. Computing environment 500 includes computing system 502 and computing system 552. Computing system 502 may be representative of financial institution 102. Computing system 552 may be representative of organization computing system 104.

Computing system 502 may include a processor 504, a memory 506, a storage 508, and a network interface 510. In some embodiments, computing system 502 may be coupled to one or more I/O device(s) 512 (e.g., keyboard, mouse, etc.). In some embodiments, computing system 552 may be in communication with data store 514.

Processor 504 may retrieve and execute program code 520 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications allowing computing system 502 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 516, operating system 518, and program code 520. Program code 520 may be accessed by processor 504 for processing (i.e., executing program instructions). Program code 520 may include, for example, executable instructions for communicating with computing system 552 to display one or more pages of website 564. Application 516 may enable a user of computing system 502 to access a functionality of computing system 552. For example, application 516 may access content managed by computing system 552, such as microservice 570. The content that is displayed to a user of computing system 502 may be transmitted from computing system 552 to computing system 502, and subsequently processed by application 516 for display through a graphical user interface (GUI) of computing system 502.

Computing system 552 may include a processor 554, a memory 556, a storage 558, and a network interface 560. In some embodiments, computing system 552 may be coupled to one or more I/O device(s) 562.

Processor 554 may retrieve and execute program code 568 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include website 564, operating system 566, program code 568, and microservice 570. Program code 568 may be accessed by processor 554 for processing (i.e., executing program instructions). Program code 568 may include, for example, executable instructions configured to perform steps discussed above in conjunction with FIGS. 2-4. As an example, processor 554 may access program code 568 to perform operations related to facilitating a secure multi-party computation of a credit score. Website 564 may be accessed by computing system 502. For example, website 564 may include content accessed by computing system 502 via a web browser or application.

Microservice 570 may be configured to facilitate a secure multi-party computation of a credit score. For example, microservice 570 may be configured to break down a credit score algorithm into a plurality of components. Generally, the credit score algorithm may utilize one or more parameters for evaluation of a credit score of an individual. One or more parameters may include, but are not limited to, payment history on an individual's accounts, amounts owed on the individual's accounts, length of the individual's credit history, types of credit implemented by the individual, any derogatory marks on an individual's credit history, pursuit of new credit (e.g., number of credit inquiries within the last X months), and the like.

Microservice 570 may include at least a compiler configured to break down a credit score algorithm into a plurality of components. In some embodiments, breaking down the credit score algorithm into the plurality of components may include compiler generating a plurality of and-gates and/or or-gates for each entity to compute.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
    retrieving, by a computing system, an algorithm, the algorithm utilizing one or more parameters for evaluation of a user metric associated with an individual;
    identifying, by the computing system, a plurality of entities contributing parameters for the evaluation of the user metric;
    compiling, by the computing system, the algorithm into a plurality of components, wherein each component corresponds to a respective entity of the plurality of entities and each component generates an output unique to the respective entity, the compiling comprising:
        converting the algorithm into one or more Boolean circuit representations, and
        garbling each Boolean circuit representation, and
        executing a protocol across the plurality of entities for securely evaluating the garbled Boolean circuit representations, wherein the protocol prevents exposure of personal identification information of the individual with among the plurality of entities;
    transmitting, by the computing system, each component to a respective entity of the plurality of entities;
    receiving, by the computing system, an evaluated component from each entity of the plurality of entities;
    verifying, by the computing system, that the received evaluated components are matching,
        wherein if at least one evaluated component does not match, the computing system reinitiates the executing, transmitting, and receiving steps until the evaluated components are matching; and
    generating, by the computing system upon verifying that the evaluated components are matching, the user metric associated with the individual by combining the evaluated components from each entity.

2. The method of claim 1, wherein transmitting, by the computing system, each component to a respective entity of the plurality of entities comprises:
    prompting each respective entity to share encrypted outputs with each remaining entity.

3. The method of claim 1, wherein the user metric cannot be generated without all components of the plurality of components.

4. The method of claim 1, further comprising:
    providing, by the computing system, the user metric to a third party system.

5. The method of claim 1, further comprising:
    causing, by the computing system, each entity to share their respective evaluated component with each remaining entity.

6. The method of claim 5, further comprising:
    causing, by the computing system, each entity to generate the user metric by locally combining the evaluated components.

7. The method of claim 1, wherein the algorithm is a credit score algorithm and wherein the user metric is a credit score.

8. A non-transitory computer readable medium comprising one or more sequences of instructions, which, when executed by a processor, causes a computing system to perform operations comprising:
    retrieving, by the computing system, an algorithm, the algorithm utilizing one or more parameters for evaluation of a user metric associated with an individual;

identifying, by the computing system, a plurality of entities contributing parameters for the evaluation of the user metric;

compiling, by the computing system, the algorithm into a plurality of components, wherein each component corresponds to a respective entity of the plurality of entities and each component generates an output unique to the respective entity, the compiling comprising:

converting the algorithm into one or more Boolean circuit representations, garbling each Boolean circuit representation, and executing a protocol across the plurality of entities for securely evaluating the garbled Boolean circuit representations, wherein during the evaluation the plurality of entities may not share a personal identification information with each other;

transmitting, by the computing system, each component to a respective entity of the plurality of entities;

receiving, by the computing system, an evaluated component from each entity of the plurality of entities;

verifying, by the computing system, that the received evaluated components are matching, wherein if at least one evaluated component does not match, the computing system reinitiates the executing, transmitting, and receiving steps until matching evaluated components are received; and generating, by the computing system upon verifying that the evaluated components are matching, the user metric associated with the individual by combining the evaluated components from each entity.

9. The non-transitory computer readable medium of claim 8, wherein transmitting, by the computing system, each component to a respective entity of the plurality of entities comprises:

prompting each respective entity to share encrypted outputs with each remaining entity.

10. The non-transitory computer readable medium of claim 8, wherein the user metric cannot be generated without all components of the plurality of components.

11. The non-transitory computer readable medium of claim 8, further comprising:

providing, by the computing system, the user metric to a third party system.

12. The non-transitory computer readable medium of claim 8, further comprising:

causing, by the computing system, each entity to share their respective evaluated component with each remaining entity.

13. The non-transitory computer readable medium of claim 12, further comprising:

causing, by the computing system, each entity to generate the user metric by locally combining the evaluated components.

14. The non-transitory computer readable medium of claim 8, wherein the algorithm is a credit score algorithm and wherein the user metric is a credit score.

15. A system comprising:

a processor; and a memory having programming instructions stored thereon, which, when executed by the processor, causes the system to perform operations comprising:

retrieving an algorithm, the algorithm utilizing one or more parameters for evaluation of a user metric associated with an individual;

identifying a plurality of entities contributing parameters for the evaluation of the user metric;

compiling the algorithm into a plurality of components, wherein each component corresponds to a respective entity of the plurality of entities and each component generates an output unique to the respective entity, the compiling comprising:

converting the algorithm into one or more Boolean circuit representations, garbling each Boolean circuit representation, and executing a protocol across the plurality of entities for securely evaluating the garbled Boolean circuit representations, wherein during the evaluation the plurality of entities may not share a personal identification information with each other;

transmitting each component to a respective entity of the plurality of entities;

receiving an evaluated component from each entity of the plurality of entities;

verifying that the received evaluated components are matching, wherein if at least one evaluated component does not match, reinitiating the executing, transmitting, and receiving steps until matching evaluated components are received; and generating, upon verifying that the evaluated components are matching, the user metric associated with the individual by combining the evaluated components from each entity.

16. The system of claim 15, wherein transmitting each component to a respective entity of the plurality of entities comprises:

prompting each respective entity to share encrypted outputs with each remaining entity.

17. The system of claim 15, wherein the user metric cannot be generated without all components of the plurality of components.

18. The system of claim 15, wherein the operations further comprise:

providing the user metric to a third party system.

19. The system of claim 15, wherein the operations further comprise:

causing each entity to share their respective evaluated component with each remaining entity.

20. The system of claim 19, wherein the operations further comprise:

causing each entity to generate the user metric by locally combining the evaluated components.

* * * * *